United States Patent
Liu

(10) Patent No.: US 11,506,943 B2
(45) Date of Patent: Nov. 22, 2022

(54) DISPLAY PANEL, DISPLAY MODULE, AND DISPLAY DEVICE

(71) Applicant: SHENZHEN CHINA STAR OPTOELECTRONICS TECHNOLOGY CO., LTD., Guangdong (CN)

(72) Inventor: Ziqi Liu, Guangdong (CN)

(73) Assignee: SHENZHEN CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 313 days.

(21) Appl. No.: 16/477,388

(22) PCT Filed: Feb. 20, 2019

(86) PCT No.: PCT/CN2019/075553
§ 371 (c)(1),
(2) Date: Jul. 11, 2019

(87) PCT Pub. No.: WO2020/164164
PCT Pub. Date: Aug. 20, 2020

(65) Prior Publication Data
US 2021/0333647 A1    Oct. 28, 2021

(30) Foreign Application Priority Data
Feb. 12, 2019    (CN) .......................... 201910110647.2

(51) Int. Cl.
*G02F 1/1343* (2006.01)
*G02F 1/1335* (2006.01)

(52) U.S. Cl.
CPC .. *G02F 1/134309* (2013.01); *G02F 1/133528* (2013.01)

(58) Field of Classification Search
CPC ............ G02F 1/1343; G02F 1/134309; G02F 1/134363; G02F 1/157; G02F 1/136286; G02F 1/136295; G02F 1/1368
See application file for complete search history.

(56) References Cited

U.S. PATENT DOCUMENTS

| 2012/0057114 A1 | 3/2012 | Chen et al. |
| 2015/0036071 A1 | 2/2015 | Kim et al. |
| 2016/0004130 A1* | 1/2016 | Hirota ............... G02F 1/134309 349/43 |
| 2016/0370616 A1 | 12/2016 | Cheng et al. |

(Continued)

FOREIGN PATENT DOCUMENTS

| CN | 101968585 A | 2/2011 |
| CN | 102109723 A | 6/2011 |

(Continued)

*Primary Examiner* — Mariam Qureshi

(57) ABSTRACT

The present application provides a display panel, a display module and a display device, the display panel includes a pixel electrode layer, at least one firstshading strip and at least one second shading strip; a pixel electrode layer is divided onto at least four pixel electrode regions by the first shading strip and the second shading strip, a plurality of branch electrodes are formed in the pixel electrode region; the branch electrodes in the two adjacent pixel electrode regions and a center line of the two adjacent pixel electrode regions are symmetrically disposed.

18 Claims, 1 Drawing Sheet

(56) References Cited

U.S. PATENT DOCUMENTS

2017/0285380 A1\* 10/2017 Zhou ................. G02F 1/136286
2018/0095335 A1\* 4/2018 Woo .................. G02F 1/134309
2021/0141266 A1\* 5/2021 Takimoto ................. G09G 3/36

FOREIGN PATENT DOCUMENTS

| CN | 102402078 A | 4/2012 |
| CN | 204166255 U | 2/2015 |
| CN | 104914634 A | 9/2015 |
| CN | 105223749 A | 1/2016 |
| CN | 106200152 A | 12/2016 |

\* cited by examiner

DISPLAY PANEL, DISPLAY MODULE, AND DISPLAY DEVICE

CROSS REFERENCE TO RELATED APPLICATION

This application claims the priority of International Application No. PCT/CN2019/075553 filed on 2019 Feb. 20, which claims priority to Chinese Application No. 201910110647.2, filed on 2019 Feb. 12. The entire disclosures of each of the above applications are incorporated herein by reference.

BACKGROUND OF INVENTION

Field of Invention

The present application relates to a display field, and particularly to a display panel, a display module, and a display device.

Description of Prior Art

A conventional liquid crystal display includes an array substrate, a color film substrate, and a liquid crystal layer formed between the array substrate and the color film substrate. A pixel electrode layer is disposed on a side of the array substrate, and a common electrode is disposed on a side of the color film substrate. The liquid crystal display drives liquid crystal to deflect through a voltage difference between pixel electrodes and the common electrode, so that the liquid crystal display displays an image.

In the pixel electrode layer, one pixel unit corresponds to three pixel electrode regions formed in a parallel, and each sub pixel corresponds to one pixel electrode region. A plurality of branch electrodes are disposed in each pixel electrode region, and the branch electrodes include four extending directions, which are bounded by a center of cross electrodes. Therefore, with an action of an electric field, the liquid crystal is pressed from four directions toward the center, and a cross dark grain is formed in the center of a cross main electrode region, thereby reducing an aperture ratio of a display panel. At the same time, it can also lead to some technical problems, such as poor alignment, etc.

Therefore, there is a need of a new display panel structure to solve the above problems.

SUMMARY OF INVENTION

The present application provides a display panel, a display module, and a display device to solve technical problems about a low aperture ratio of a display panel in the prior art.

In order to solve the above technical problems, the present application provides technical programs as following:

The present application provides a display panel, including:

a pixel electrode layer, at least one first shading strip and at least one second shading strip;

the first shading strip and the second shading strip are vertically intersected;

the pixel electrode layer is divided into at least four pixel electrode regions by the first shading strip and the second shading strip, a plurality of branch electrodes are formed in the pixel electrode region;

one pixel electrode region corresponds to one sub pixel of the display panel; and the branch electrodes positioned in the two adjacent pixel electrode regions are symmetrical along a center line of the two adjacent pixel electrode regions.

In the display panel of the present application, the display panel includes at least one first sub pixel, at least one second sub pixel, at least one third sub pixel and at least one fourth sub pixel;

a plurality of extending directions of the branch electrodes in the pixel electrode region corresponding to the first sub pixel, the second sub pixel, the third sub pixel and the fourth sub pixel are different;

a plurality of extending directions of the branch electrodes in the pixel electrode region corresponding to each first sub pixel are the same;

a plurality of extending directions of the branch electrodes in the pixel electrode region corresponding to each second sub pixel are the same;

a plurality of extending directions of the branch electrodes in the pixel electrode region corresponding to each third sub pixel are the same; and a plurality of extending directions of the branch electrodes in the pixel electrode region corresponding to each fourth sub pixel are the same.

In the display panel of the present application, the first sub pixel, the second sub pixel, the third sub pixel, and the fourth sub pixel are one of a red sub pixel, a green sub pixel, a blue sub pixel and a white sub pixel; and colors of the sub pixels corresponding to the first sub pixel, the second sub pixel, the third sub pixel, and the fourth sub pixel are different.

In the display panel of the present application, a plurality of the branch electrodes in each pixel electrode region are equally spaced; and an included angle folioed between each branch electrode and the first shading strip or the second shading strip is a, $0°<a<90°$.

In the display panel of the present application, the first shading strips extend along a horizontal direction; and the second shading strips extend along a vertical direction.

In the display panel of the present application, in a horizontal direction, a center line of the two adjacent pixel electrode regions is coincided with the second light shading strip; and in a vertical direction, a center line of the two adjacent pixel electrode regions is located on a non-liquid crystal distribution region in the pixel electrode region.

The present application further provides a display module, which includes a display panel, and a polarizer layer and a cover layer formed on the display panel;

the display panel includes:

a pixel electrode layer, at least one first shading strip and at least one second shading strip;

the first shading strip and the second shading strip are vertically intersected;

the pixel electrode layer is divided into at least four pixel electrode regions by the first shading strip and the second shading strip, a plurality of branch electrodes are formed in the pixel electrode region;

one pixel electrode region corresponds to one sub pixel of the display panel; and the branch electrodes positioned in the two adjacent pixel electrode regions are symmetrical along a center line of the two adjacent pixel electrode regions.

In the display module of the present application, the display panel includes at least one first sub pixel, at least one second sub pixel, at least one third sub pixel and at least one fourth sub pixel;

a plurality of extending directions of the branch electrodes in the pixel electrode region corresponding to the first sub pixel, the second sub pixel, the third sub pixel and the fourth sub pixel are different;

a plurality of extending directions of the branch electrodes in the pixel electrode region corresponding to each first sub pixel are the same;

a plurality of extending directions of the branch electrodes in the pixel electrode region corresponding to each second sub pixel are the same;

a plurality of extending directions of the branch electrodes in the pixel electrode region corresponding to each third sub pixel are the same; and a plurality of extending directions of the branch electrodes in the pixel electrode region corresponding to each fourth sub pixel are the same.

In the display module of the present application, the first sub pixel, the second sub pixel, the third sub pixel, and the fourth sub pixel are one of a red sub pixel, a green sub pixel, a blue sub pixel and a white sub pixel; and colors of the sub pixels corresponding to the first sub pixel, the second sub pixel, the third sub pixel, and the fourth sub pixel are different.

In the display module of the present application, a plurality of the branch electrodes in each pixel electrode region are equally spaced; and an included angle formed between each branch electrode and the first shading strip or the second shading strip is a, 0°<a<90°.

In the display module of the present application, the first shading strips extend along a horizontal direction; and the second shading strips extend along a vertical direction.

In the display module of the present application, in a horizontal direction, a center line of the two adjacent pixel electrode regions is coincided with the second light shading strip; and in a vertical direction, a center line of the two adjacent pixel electrode regions is located on a non-liquid crystal distribution region in the pixel electrode region.

The present application provides a display device including a display module, and the display module includes a display panel, and a polarizer layer and a cover layer formed on the display panel;

the display panel includes:

a pixel electrode layer, at least one first shading strip and at least one second shading strip;

the first shading strip and the second shading strip are vertically intersected;

the pixel electrode layer is divided into at least four pixel electrode regions by the first shading strip and the second shading strip, a plurality of branch electrodes are formed in the pixel electrode region;

one pixel electrode region corresponds to one sub pixel of the display panel; and the branch electrodes positioned in the two adjacent pixel electrode regions are symmetrical along a center line of the two adjacent pixel electrode regions.

In the display device of the present application, the display panel includes at least one first sub pixel, at least one second sub pixel, at least one third sub pixel and at least one fourth sub pixel;

a plurality of extending directions of the branch electrodes in the pixel electrode region corresponding to the first sub pixel, the second sub pixel, the third sub pixel and the fourth sub pixel are different;

a plurality of extending directions of the branch electrodes in the pixel electrode region corresponding to each first sub pixel are the same;

a plurality of extending directions of the branch electrodes in the pixel electrode region corresponding to each second sub pixel are the same;

a plurality of extending directions of the branch electrodes in the pixel electrode region corresponding to each third sub pixel are the same; and a plurality of extending directions of the branch electrodes in the pixel electrode region corresponding to each fourth sub pixel are the same.

In the display device of the present application, the first sub pixel, the second sub pixel, the third sub pixel, and the fourth sub pixel are one of a red sub pixel, a green sub pixel, a blue sub pixel and a white sub pixel; and colors of the sub pixels corresponding to the first sub pixel, the second sub pixel, the third sub pixel, and the fourth sub pixel are different.

In the display device of the present application, a plurality of the branch electrodes in each pixel electrode region are equally spaced; and an included angle formed between each branch electrode and the first shading strip or the second shading strip is a, 0°<a<90°.

In the display device of the present application, the first shading strips extend along a horizontal direction; and the second shading strips extend along a vertical direction.

In the display device of the present application, in a horizontal direction, a center line of the two adjacent pixel electrode regions is coincided with the second light shading strip; and in a vertical direction, a center line of the two adjacent pixel electrode regions is located on a non-liquid crystal distribution region in the pixel electrode region.

The beneficial effect is: one extending direction of the branch electrodes in the pixel electrode region corresponding to each sub pixel is set to eliminate the cross dark grain and to improve an aperture ratio of the display panel.

BRIEF DESCRIPTION OF DRAWINGS

In order to more clearly illustrate the embodiments or the technical solutions in the prior art, the drawings to be used in the embodiments or the prior art description will be briefly described below. Obviously, the drawings in the following description are merely inventions. For some embodiments, other drawings may be obtained from those of ordinary skill in the art without departing from the drawings.

DETAILED DESCRIPTION OF PREFERRED EMBODIMENTS

Figure 1:
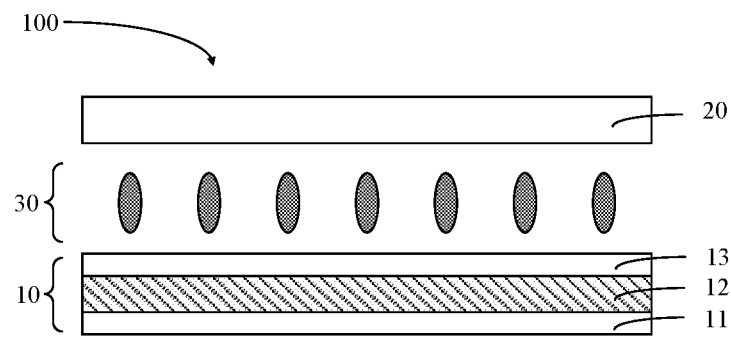
FIG. 1 is a schematic view of a display panel of the present disclosure.

The following description of the various embodiments is provided to illustrate the specific embodiments of the invention. Directional terms mentioned in this application, such as "upper", "lower", "previous", "post", "left", "right", "inside", "outside", "side", etc., are only references Attach the direction of the drawing. Therefore, the directional terminology used is for the purpose of illustration and understanding, and is not intended to be limiting. In the figures, structurally similar elements are denoted by the same reference numerals.

Referring to FIG. 1, FIG. 1 is a schematic view of a display panel 100 of the present disclosure.

The display panel 100 includes an array substrate 10, a color film substrate 20 formed opposite to the array substrate 10, and a liquid crystal layer 30 formed between the array substrate 10 and the color film substrate 20.

The array substrate 10 includes a substrate 11, a thin film transistor layer 12 formed on the substrate 11, and a pixel electrode layer 13 formed on the thin film transistor layer 12.

In the present exemplary embodiment, a raw material of the substrate 11 is one of a glass substrate, a quartz substrate, and a resin substrate, etc.

The thin film transistor layer 12 includes an etched barrier layer type, a back channel etched type, or a top gate thin film transistor type, etc., and other structure types without specific restrictions. For example, the thin film transistor layer 12 with the top gate thin film transistor type includes an active layer, a gate insulating layer, a plurality of gate electrodes, a spaced insulating layer, a plurality of source drain electrodes and a passivation layer.

The pixel electrode layer 13 is formed on the passivation layer.

In the present exemplary embodiment, the pixel electrode layer 13 is a transparent electrode. The pixel electrode layer 13 is made of indium tin oxide (ITO).

Figure 2:
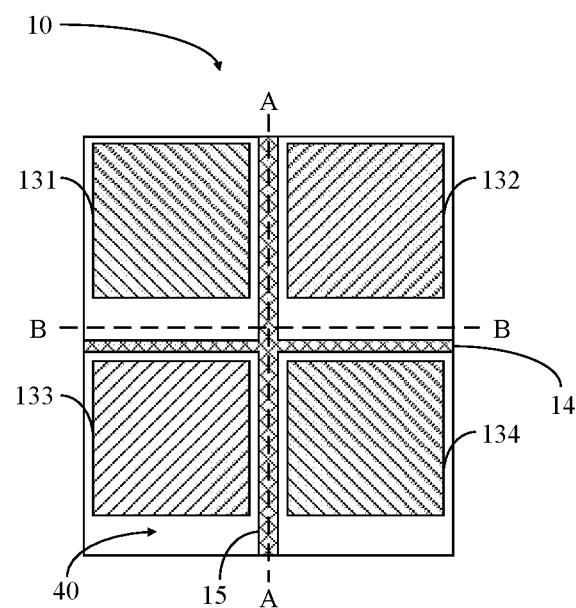
FIG. 2 is a top view of an array substrate of a display panel of the present disclosure.

Referring to FIG. 2, FIG. 2 is a top view of an array substrate 10 of a display panel 100 of the present disclosure The array substrate 10 includes at least one first shading strip 14 and at least one second shading strip 15. The first shading strip 14 and the second shading strip 15 are vertically intersected.

In the present exemplary embodiment, the first shading strip 14 is a horizontal shading strip, and the first shading strip 14 extends along a horizontal direction. The second shading strip 15 is a vertical shading strip, and the second shading strip 15 extends along a vertical direction.

In the present exemplary embodiment, the first shading strip 14 is composed by the gate electrodes placed in the array substrate 10, and the second shading strip 15 is composed by the source drain electrodes placed in the array substrate 10.

The pixel electrode layer 13 is divided into at least four pixel electrode regions by the first shading strip 14 and the second shading strip 15. A number of the pixel electrode regions is determined according to a number of the first shading strips 14 and the second shading strips 15.

In the present exemplary embodiment, a plurality of branch electrodes are formed in the each of the pixel electrode regions. Each of the pixel electrode regions corresponds to each sub pixel of the display panel 100.

In the present exemplary embodiment, a plurality of branch electrodes placed in the two adjacent pixel electrode regions and a center line of the two adjacent pixel electrode regions are symmetrically disposed.

In a horizontal direction, a center line of two adjacent pixel electrode regions is coincided with the vertical shading strip, referring to the line AA in the FIG. 2. In a vertical direction, a center line of two adjacent pixel electrode regions is located on a non-liquid crystal distribution region 40 in the pixel electrode region, referring to the line BB in the FIG. 2.

Referring to FIG. 1 and FIG. 2, the display panel 100 includes at least one first sub pixel, at least one second sub pixel, at least one third sub pixel and at least one fourth sub pixel.

A plurality of extending directions of the branch electrodes in the pixel electrode region corresponding to the first sub pixel, the second sub pixel, the third sub pixel and the fourth sub pixel are different.

In the present exemplary embodiment, a plurality of extending directions of the branch electrodes in the pixel electrode region corresponding to each of the first sub-pixels are the same. A plurality of extending directions of the branch electrodes in the pixel electrode region corresponding to each of the second sub-pixels are the same. A plurality of extending directions of the branch electrodes in the pixel electrode region corresponding to each third sub-pixel are the same. A plurality of extending directions of the branch electrodes in the pixel electrode region corresponding to each fourth sub-pixel are the same.

The first sub pixel, the second sub pixel, the third sub pixel, and the fourth sub pixel are one of a red sub pixel, a green sub pixel, a blue sub pixel and a white sub pixel.

Colors of the sub pixels corresponding to the first sub pixel, the second sub pixel, the third sub pixel, and the fourth sub pixel are different.

In the display panel 100 of the exemplary embodiment of the present disclosure, a plurality of branch electrodes in the each pixel electrode region are equally spaced. An included angle formed between each branch electrode and the first shading strip 14 or the second shading strip 15 is a, $0°<a<90°$.

The specific embodiment is described as below.

Referring to FIG. 2, a pixel unit includes a red sub pixel, a green sub pixel, a blue sub pixel, and a white sub pixel.

In the present exemplary embodiment, the pixel electrode region corresponding to each sub pixel includes a plurality of branch electrodes. A plurality of extending directions of the branch electrodes in the pixel electrode region corresponding to each sub-pixel are the same. A plurality of extending directions of the branch electrodes in the two adjacent pixel electrode regions are symmetrically distributed by a line AA or a line BB.

The first sub pixel is a red sub pixel. The second sub pixel is a green sub pixel. The third sub pixel is a blue sub pixel. The fourth sub pixel is a white sub pixel.

The pixel electrode layer 13 includes a first pixel electrode region 131, a second pixel electrode region 132, a third pixel electrode region 133 and a fourth pixel electrode region 134.

In the present exemplary embodiment, a red sub pixel corresponds to a first pixel electrode region 131, a green sub pixel corresponds to a first pixel electrode region 132, a blue sub pixel corresponds to a first pixel electrode region 133, and a white sub pixel corresponds to a first pixel electrode region 134.

The branch electrodes in the first pixel region and the branch electrodes in the second pixel region are symmetrically disposed by a line AA. The branch electrodes in the first pixel region and the branch electrodes in the third pixel region are symmetrically disposed by a line BB.

The branch electrodes in the fourth pixel region and the branch electrodes in the second pixel region are symmetrically disposed by a line BB. The branch electrodes in the fourth pixel region and the branch electrodes in the third pixel region are symmetrically disposed by a line AA.

A plurality of included angles formed between the first pixel electrode region 131, the second pixel electrode region 132, the third pixel electrode region 133 and the fourth pixel electrode region 134 and a horizontal shading strip or a vertical shading strip are the same.

In the present exemplary embodiment, a plurality of included angle formed between the branch electrodes in the first pixel electrode region 131, the second electrode region 132, the third electrode region 133 and the fourth pixel region 134 and a horizontal shading strip or a vertical shading strip are 35°-55°.

In the present exemplary embodiment, a plurality of included angles formed between the branch electrodes in the first pixel electrode region 131, the second electrode region 132, the third electrode region 133 and the fourth pixel region 134 and a horizontal shading strip or a vertical shading strip are 45°.

The present exemplary embodiment sets one extending direction of the branch electrodes in the pixel electrode region corresponding to each sub pixel to eliminate a cross dark grain existed in each pixel unit in the prior art, and improves an aperture ratio of the display panel 100. In addition, an intervention of a white sub-pixel increases the light transmittance of the display panel 100 and improves brightness of the display panel 100.

The present application further provides a display module, and the display module includes a display panel 100, and a cover layer and a polarizer layer formed on the display panel 100.

Referring to FIG. 1, the display panel 100 includes an array substrate 10, a color film substrate 20 formed opposite to the array substrate 10, and a liquid crystal layer 30 formed between the array substrate 10 and the color film substrate 20.

The array substrate 10 includes a substrate 11, a thin film transistor layer 12 formed on the substrate 11, and a pixel electrode layer 13 formed on the thin film transistor layer 12.

In the present exemplary embodiment, a raw material of the substrate 11 is one of a glass substrate, a quartz substrate, and a resin substrate, etc.

The thin film transistor layer 12 includes an etched barrier layer type, a back channel etched type, or a top gate thin film transistor type, etc., and other structure types without specific restrictions. For example, the thin film transistor layer 12 with the top gate thin film transistor type includes an active layer, a gate insulating layer, a plurality of gate electrodes, a spaced insulating layer, a plurality of source drain electrodes and a passivation layer.

The pixel electrode layer 13 is formed on the passivation layer.

In the present exemplary embodiment, the pixel electrode layer 13 is a transparent electrode. The pixel electrode layer 13 is made of indium tin oxide (ITO).

Referring to FIG. 2, the array substrate 10 includes at least one first shading strip 14 and at least one second shading strip 15. The first shading strip 14 and the second shading strip 15 are vertically intersected.

In the present exemplary embodiment, the first shading strip 14 is a horizontal shading strip, and the first shading strip 14 extends along a horizontal direction. The second shading strip 15 is a vertical shading strip, and the second shading strip 15 extends along a vertical direction.

In the present exemplary embodiment, the first shading strip 14 is composed by the gate electrodes placed in the array substrate 10, and the second shading strip 15 is composed by the source drain electrodes placed in the array substrate 10.

The pixel electrode layer 13 is divided into at least four pixel electrode regions by the first shading strip 14 and the second shading strip 15. A number of the pixel electrode regions is determined according to a number of the first shading strips 14 and the second shading strips 15.

In the present exemplary embodiment, a plurality of branch electrodes are formed in the each of the pixel electrode regions. Each pixel electrode region corresponds to each sub pixel of the display panel 100.

In the present exemplary embodiment, a plurality of branch electrodes placed in the two adjacent pixel electrode regions and a center line of the two adjacent pixel electrode regions are symmetrically disposed.

In a horizontal direction, a center line of two adjacent pixel electrode regions is coincided with the vertical shading strip, referring to the line AA in the FIG. 2. In a vertical direction, a center line of two adjacent pixel electrode regions is located on a non-liquid crystal distribution region 40 in the pixel electrode region, referring to the line BB in the FIG. 2.

Referring to FIG. 1 and FIG. 2, the display panel 100 includes at least one first sub pixel, at least one second sub pixel, at least one third sub pixel and at least one fourth sub pixel (the sub pixel is not marked).

A plurality of extending directions of the branch electrodes in the pixel electrode region corresponding to the first sub pixel, the second sub pixel, the third sub pixel and the fourth sub pixel are different.

In the present exemplary embodiment, a plurality of extending directions of the branch electrodes in the pixel electrode region corresponding to each first sub-pixels are the same. A plurality of extending directions of the branch electrodes in the pixel electrode region corresponding to each second sub-pixel are the same. A plurality of extending directions of the branch electrodes in the pixel electrode region corresponding to each third sub-pixel are the same. A plurality of extending directions of the branch electrodes in the pixel electrode region corresponding to each fourth sub-pixel are the same.

The first sub pixel, the second sub pixel, the third sub pixel, and the fourth sub pixel are one of a red sub pixel, a green sub pixel, a blue sub pixel and a white sub pixel. Colors of the sub pixels corresponding to the first sub pixel, the second sub pixel, the third sub pixel, and the fourth sub pixel are different.

In the display panel 100 of the exemplary embodiment of the present disclosure, a plurality of branch electrodes in the each pixel electrode region are equally spaced. An included angle formed between each branch electrode and the first shading strip 14 or the second shading strip 15 is a, $0°<a<90°$.

The specific embodiment is described as below.

Referring to FIG. 2, a pixel unit includes a red sub pixel, a green sub pixel, a blue sub pixel, and a white sub pixel.

In the present exemplary embodiment, the pixel electrode region corresponding to each sub pixel includes a plurality of branch electrodes. A plurality of extending directions of the branch electrodes in the pixel electrode region corresponding to each sub-pixel are the same. A plurality of extending directions of the branch electrodes in the two adjacent pixel electrode regions are symmetrically distributed by a line AA or a line BB.

The first sub pixel is a red sub pixel. The second sub pixel is a green sub pixel. The third sub pixel is a blue sub pixel. The fourth sub pixel is a white sub pixel.

The pixel electrode layer 13 includes a first pixel electrode region 131, a second pixel electrode region 132, a third pixel electrode region 133 and a fourth pixel electrode region 134.

In the present exemplary embodiment, a red sub pixel corresponds to a first pixel electrode region 131, a green sub pixel corresponds to a first pixel electrode region 132, a blue sub pixel corresponds to a first pixel electrode region 133, and a white sub pixel corresponds to a first pixel electrode region 134.

The branch electrodes in the first pixel region and the branch electrodes in the second pixel region are symmetrically disposed by a line AA. The branch electrodes in the first pixel region and the branch electrodes in the third pixel region are symmetrically disposed by a line BB.

The branch electrodes in the fourth pixel region and the branch electrodes in the second pixel region are symmetrically disposed by a line BB. The branch electrodes in the fourth pixel region and the branch electrodes in the third pixel region are symmetrically disposed by a line AA.

A plurality of included angles formed between the first pixel electrode region 131, the second pixel electrode region 132, the third pixel electrode region 133 and the fourth pixel electrode region 134 and a horizontal shading strip or a vertical shading strip are the same.

In the present exemplary embodiment, a plurality of included angle formed between the branch electrodes in the first pixel electrode region 131, the second electrode region 132, the third electrode region 133 and the fourth pixel region 134 and a horizontal shading strip or a vertical shading strip are 35°-55°.

In the present exemplary embodiment, a plurality of included angles formed between the branch electrodes in the first pixel electrode region 131, the second electrode region 132, the third electrode region 133 and the fourth pixel region 134 and a horizontal shading strip or a vertical shading strip are 45°.

The present exemplary embodiment sets one extending direction of the branch electrodes in the pixel electrode region corresponding to each sub pixel to eliminate the cross dark grain existed in each pixel unit in the prior art, and improves the aperture ratio of the display panel 100. In addition, an intervention of a white sub-pixel increases the light transmittance of the display panel 100 and improves brightness of the display panel 100.

The present application further provides a display device, and the display device includes the display module. A working principle of the display device is the same or similar to that of the above display module, so no details needed.

The display device includes a mobile phone, a tablet computer, a computer display, a game machine, a television, a display screen, a wearable device, and other household appliances or household appliances with display functions and so on, but is not limited.

The present application provides a display panel, a display module, and a display device, the display panel includes a pixel electrode layer, at least one first shading strip, and at least one second shading strip; the first shading strip and the second shading strip are vertically intersected; the pixel electrode layer is divided into at least fourth pixel electrode regions by the first shading strip and the second shading strip, a plurality of branch electrodes are formed in the pixel electrode region; each pixel electrode corresponds to each sub pixel of the display panel; the branch electrodes in the two adjacent pixel electrode regions and a center line of the two adjacent pixel electrode regions are symmetrically disposed. In the present application, one extending direction of the branch electrodes in the pixel electrode region corresponding to each sub pixel is set to eliminate the cross dark grain and to improve an aperture ratio of the display panel.

As is understood by persons skilled in the art, the foregoing preferred embodiments of the present disclosure are illustrative rather than limiting of the present disclosure. It is intended that they cover various modifications and that similar arrangements be included in the spirit and scope of the present disclosure, the scope of which should be accorded the broadest interpretation so as to encompass all such modifications and similar structures.

What is claimed is:

1. A display panel, comprising a pixel electrode layer, a first shading strip, and a second shading strip, wherein the first shading strip and the second shading strip are vertically intersected, the pixel electrode layer is divided into four pixel electrode regions by the first shading strip and the second shading strip, the pixel electrode layer comprises a plurality of branch electrodes disposed in the pixel electrode regions, only a lower side of each of the pixel electrode regions is provided with a non-liquid crystal distribution region, in a vertical direction, a center line between two adjacent pixel electrode regions is located in one non-liquid crystal distribution region between the two adjacent pixel electrode regions, the first shading strip is parallel to the center line and does not overlap the center line, and the display panel further comprises a red sub pixel, a green sub pixel, a blue sub pixel, and a white sub pixel respectively corresponding to the four pixel electrode regions.

2. The display panel of claim 1, wherein the branch electrodes disposed in any two adjacent pixel electrode regions are symmetrical with respect to a center line between the any two adjacent pixel electrode regions.

3. The display panel of claim 2, wherein the branch electrodes in each of the pixel electrode regions are equally spaced.

4. The display panel of claim 2, wherein an included angle between each branch electrode and the first shading strip or the second shading strip is a, and 0°<a<90°.

5. The display panel of claim 1, wherein the first shading strips extend along a horizontal direction, and the second shading strips extend along the vertical direction.

6. The display strip of claim 5, wherein in the horizontal direction, a center line of two adjacent pixel electrode regions is coincided with the second shading strip.

7. A display module, comprising a display panel, a polarizer layer, and a cover layer that are disposed in sequence, wherein the display panel comprises a pixel electrode layer, a first shading strip, and a second shading strip, the first shading strip and the second shading strip are vertically intersected, the pixel electrode layer is divided into four pixel electrode regions by the first shading strips and the second shading strips, the pixel electrode layer comprises a plurality of branch electrodes disposed in the pixel electrode regions, only a lower side of each of the pixel electrode regions is provided with a non-liquid crystal distribution region, in a vertical direction, a center line between two adjacent pixel electrode regions is located in one non-liquid crystal distribution region between the two adjacent pixel electrode regions, the first shading strip is parallel to the center line and does not overlap the center line, and the display panel further comprises a red sub pixel, a green sub pixel, a blue sub pixel and a white sub pixel respectively corresponding to the four pixel electrode regions.

8. The display module of claim 7, wherein the branch electrodes disposed in any two adjacent pixel electrode regions are symmetrical with respect to a center line between the any two adjacent pixel electrode regions.

9. The display module of claim 8, wherein the branch electrodes in each of the pixel electrode regions are equally spaced.

10. The display module of claim 8, wherein an included angle between each branch electrode and the first shading strip or the second shading strip is a, and 0°<a<90°.

11. The display module of claim 7, wherein the first shading strip extends in a horizontal direction, and the second shading strip extends in the vertical direction.

12. The display module of claim 11, wherein in the horizontal direction, a center line of two adjacent pixel electrode regions is coincided with the second shading strip.

13. A display device, comprising a display module, wherein the display module comprises a display panel, a polarizer layer, and a cover layer that are disposed in sequence, wherein the display panel comprises a pixel electrode layer, a first shading strip, and a second shading strip, the first shading strip and the second shading strip are vertically intersected, the pixel electrode layer is divided into four pixel electrode regions by the first shading strips and the second shading strips, the pixel electrode layer comprises a plurality of branch electrodes disposed in the pixel electrode regions, only a lower side of each of the pixel electrode regions is provided with a non-liquid crystal distribution region, in a vertical direction, a center line between two adjacent pixel electrode regions is located in one non-liquid crystal distribution region between the two adjacent pixel electrode regions, the first shading strip is parallel to the center line and does not overlap the center line, and the display panel further comprises a red sub pixel, a green sub pixel, a blue sub pixel and a white sub pixel respectively corresponding to the four pixel electrode regions.

14. The display module of claim 13, wherein the branch electrodes disposed in any two adjacent pixel electrode regions are symmetrical with respect to a center line between the any two adjacent pixel electrode regions.

15. The display module of claim 14, wherein the branch electrodes in each of the pixel electrode regions are equally spaced.

16. The display module of claim 14, wherein an included angle between each branch electrode and the first shading strip or the second shading strip is a, and 0°<a<90°.

17. The display module of claim 13, wherein the first shading strips extend along a horizontal direction, and the second shading strips extend along the vertical direction.

18. The display module of claim 17, wherein in the horizontal direction, a center line of two adjacent pixel electrode regions is coincided with the second shading strip.

* * * * *